United States Patent
Kumashiro

(10) Patent No.: US 6,369,912 B1
(45) Date of Patent: Apr. 9, 2002

(54) IMAGE PROCESSING APPARATUS CAPABLE OF APPLYING LINE COMPONENT TO IMAGE

(75) Inventor: Hideo Kumashiro, Fukuyama (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/234,513

(22) Filed: Jan. 21, 1999

(30) Foreign Application Priority Data

Jan. 23, 1998 (JP) .......................................... 10-026658

(51) Int. Cl.⁷ .......................... H04N 1/405; G06K 15/02
(52) U.S. Cl. .......................... 358/1.9; 358/457; 382/252
(58) Field of Search .......................... 358/1.9, 457, 466, 358/456, 458, 460, 298, 535; 382/252, 270

(56) References Cited

U.S. PATENT DOCUMENTS 5,243,445 A  9/1993  Koike .......................... 358/460

FOREIGN PATENT DOCUMENTS

| JP | 63-174186 A | 7/1988 |
| JP | 6-98157 | 4/1994 |
| JP | 6-141171 | 5/1994 |

*Primary Examiner*—Scott Rogers
(74) *Attorney, Agent, or Firm*—Burns, Doane, Swecker & Mathis, LLP

(57) ABSTRACT

An image processing apparatus capable of reducing a non-uniform pitch in the sub scanning direction of an image, caused such as by unstable paper feed of a printer, for example, is formed as described below. An adder adds the density value of one pixel of an input multi-valued image and a diffused error output from an error weighting filter. A comparator compares an output from the adder and a corresponding threshold of a variable threshold matrix, and outputs the result as a binary image. The variable threshold matrix is formed of two sub matrices with a size of 3×3 connected in a main scanning direction, and an average value of thresholds in one sub matrix is larger than another. Accordingly, a line component vertical to the main scanning direction is added in an output image. This line component masks a nonuniform pitch in the sub scanning direction.

24 Claims, 20 Drawing Sheets

FIG. 14

| | HIGHLIGHT TEXTURE | NONUNIFORM PITCH MASKING | RESOLUTION IN SUB SCANNING DIRECTION | PROCESSING SPEED | MEMORY COST |
|---|---|---|---|---|---|
| FIRST EMBODIMENT | GOOD | GOOD | GOOD | BAD | BAD |
| SECOND EMBODIMENT | GOOD | GOOD | GOOD | BAD | BAD |
| THIRD EMBODIMENT | GOOD | GOOD | GOOD | GOOD | GOOD |

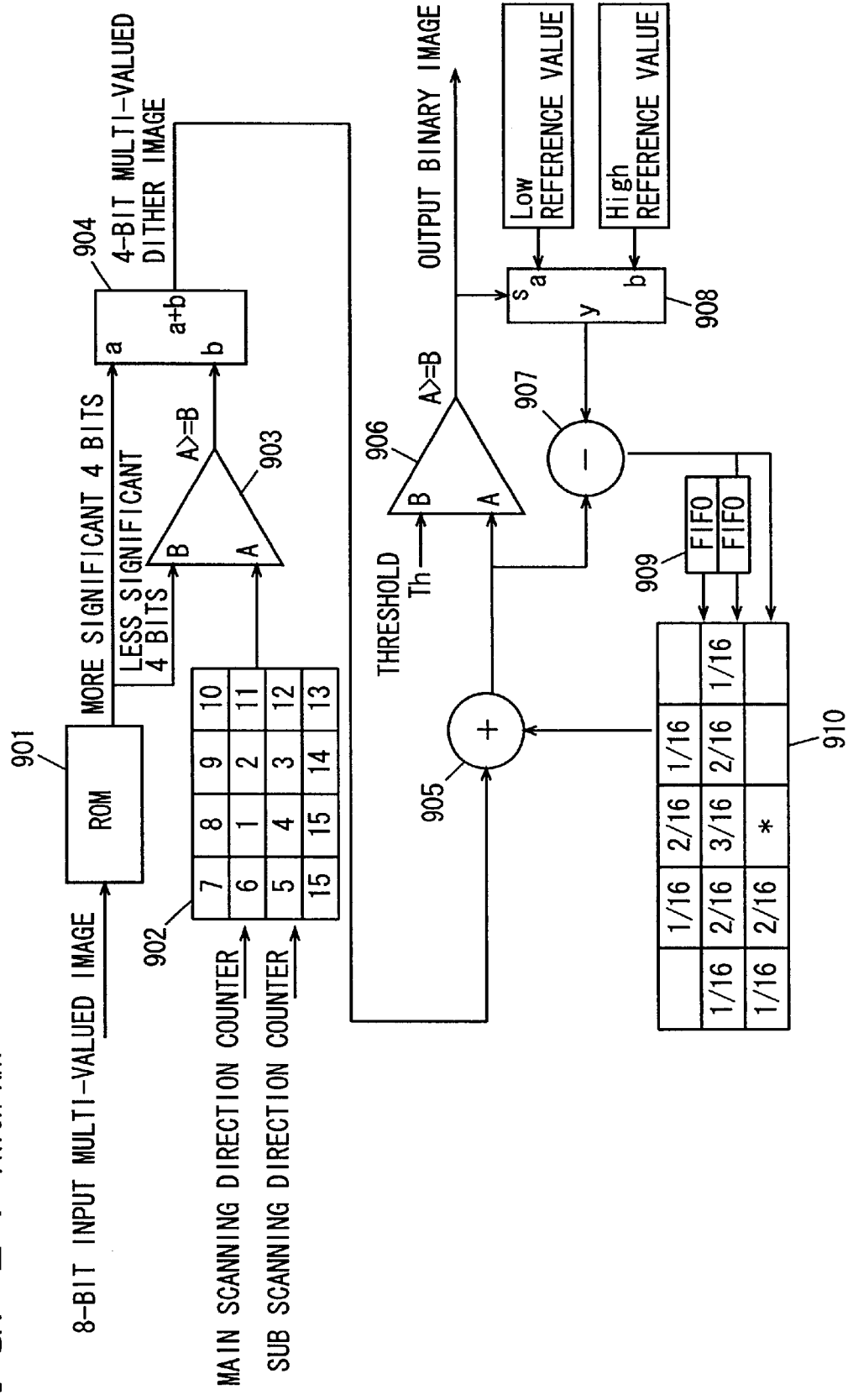
F I G. 2 1  PRIOR ART

F I G. 2 2 PRIOR ART

FIG. 23        PRIOR ART
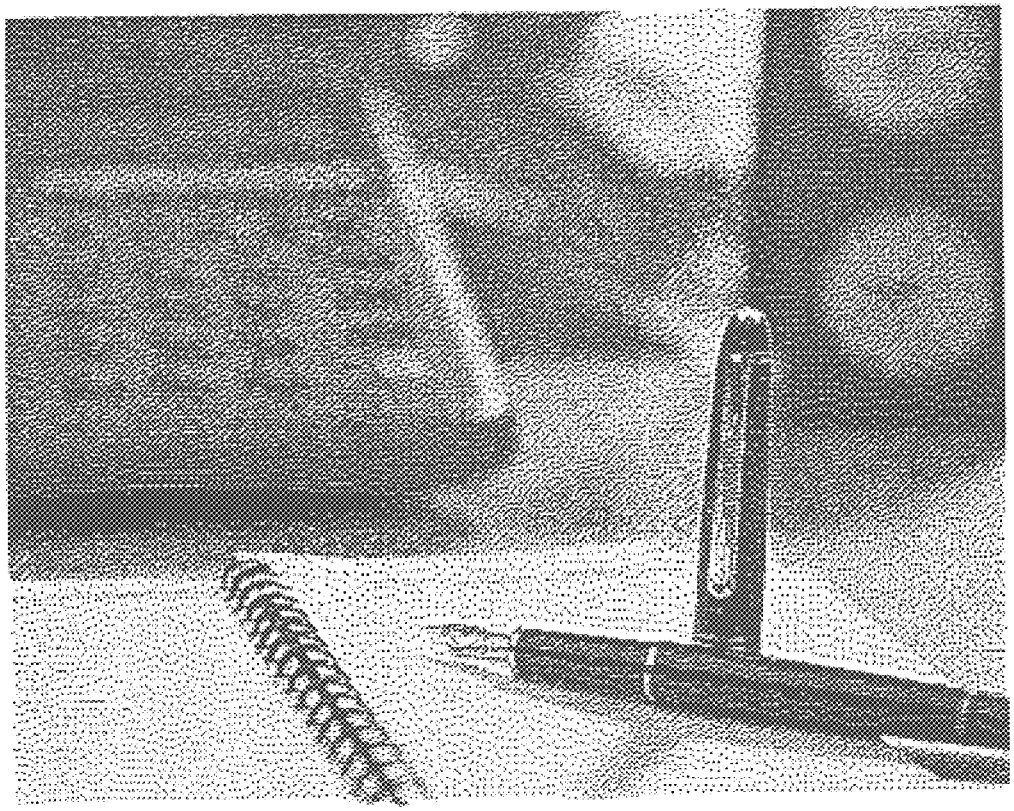

F I G. 24

| METHOD | HIGHLIGHT TEXTURE | NONUNIFORM PITCH MASKING | RESOLUTION IN SUB SCANNING DIRECTION | PROCESSING SPEED | MEMORY COST |
|---|---|---|---|---|---|
| 1. TYPICAL ERROR DIFFUSION | BAD | BAD | GOOD | BAD | BAD |
| 2. PERIODIC THRESHOLD VARIATION | GOOD | GOOD | BAD | BAD | BAD |
| 3. PERIODIC BIAS VALUE ADDITION | GOOD | GOOD | BAD | BAD | BAD |
| 4. MULTI-VALUED DITHER ERROR DIFFUSION | GOOD | GOOD | BAD | GOOD | GOOD |

IMAGE PROCESSING APPARATUS CAPABLE OF APPLYING LINE COMPONENT TO IMAGE

This application is based on Application No. 10-026658 filed in Japan, the contents of which is hereby incorporated by reference.

BACKGROUND OF THE INVENTION

1. Field of the Invention

The present invention relates to image processing apparatuses and more particularly to an image processing apparatus for carrying out binarization using the error diffusion method.

2. Description of the Related Art

In the field of image processing, the technique of converting image data of continuous multiple gradation levels (multiple values) into binary data consisting of "0s" and "1s" is conventional known.

FIG. 15 is a block diagram showing a structure of an image processing apparatus adapting such a technique.

Referring to the figure, the image processing apparatus includes an MPU 501 for controlling the entire apparatus, an operation panel 502 for receiving user inputs, a readout sensor 503 formed of a photoelectric device such as a CCD and a driving system thereof, an A/D conversion circuit 504 for digitally converting an output from the readout sensor, a Log conversion circuit 505 for carrying out Log conversion of a digital signal, an MTF correction circuit 506 for carrying out sharpness correction, a gamma correction circuit 507 for carrying out gamma correction, a binarization circuit 508 for binarizing gamma-corrected data, and a printer (image recording device) 509.

Readout sensor 503 scans a mixed format original of a gradation image and line copy image, for example, and produces a sampling analog signal. A/D conversion circuit 504 quantizes the sampling analog signal as gradation data where one pixel has a value of 8 bits (256 gradation levels), for example.

Log conversion circuit 505 calculates 8-bit gradation density data which has a log relationship with the gradation data from the gradation data. Sharpness correction circuit 506 corrects the sharpness of a gradation density data image using a digital filter such as a Laplacian filter.

Gamma correction circuit 507 corrects a difference in the gradation curve between readout sensor 503 and printer 509 to implement desired gamma characteristics as the entire image processing apparatus or to set gamma characteristics desired by users. Specifically, gamma correction circuit 507 has a lookup table (LUT) RAM of approximately 8 bits (256 words). MPU1 sets nonlinear gamma correction data in lookup table RAM and carries out gamma correction.

Binarization circuit 508 uses an area gradation binarization method such as the error diffusion binarization method to convert 8-bit gradation density data that is gamma-corrected into 1-bit binary data according to each light/dark level. The converted 1-bit binary data is printed on a recording medium by printer 509. Printer 509 is an electronic photo printer or an ink jet printer, for example.

The error diffusion binarization method carried out in binarization circuit 508 calculates a density difference (binarization error) for each pixel between an input image density and an output image density and diffuses the calculation result, which is provided with particular weights, to peripheral pixels. This method is reported in R. W. Floyd, L. Steinberg "An adaptive algorithm for spatial gray scale" SID. 17, pp. 75–77 (1976).

FIG. 16 is a block diagram showing a specific structure of binarization circuit 508 in FIG. 15. Here, binarization circuit 508 converts an 8-bit (256-gradation) input multi-valued image into a 1-bit (binary) image.

Referring to the figure, binarization circuit 508 includes an adder 601, a comparator 602, a selector 603, a subtracter 604, an error memory 605, and an error weighting filter 606.

Adder 601 adds a binarization error that is weight-averaged by error weighting filters 606 to a density value of a pixel of interest (*) of an input multi-valued image. Thus, the error is corrected. When the density value of an input image is 8 bits, an adder of approximately 10 bits with minus bits included is generally required as adder 601.

Comparator 602 compares a fixed threshold Th and a density value of a pixel of interest of an error-corrected input multi-valued image. A binary output of the pixel of interest is provided according to the comparison result. Specifically, when the density value of a pixel of interest of an error-corrected input multi-valued image is at least threshold Th, "1" is output from comparator 602. Otherwise, "0" is output. An 8-bit comparator is generally used as comparator 602.

Selector 603 outputs a reference value of either High or Low that is set in advance by MPU 501, for example, according to an output from comparator 602.

Subtracter 604 calculates a difference (that is, a binarization error) between a reference value output from selector 603 and a density value of a pixel of interest of an error-corrected input multi-valued image. A 9-bit subtracter is generally used as subtracter 604.

Error memory 605 has the structure of an FIFO and holds one to several lines of binarization errors. A memory where one word has a width of 9 bits is generally used as the FIFO memory.

Error weighting filter 606 calculates a weighted average value of binarization errors stored in error memory 605. Specifically, binarization errors of pixels peripheral to a pixel of interest (*) are multiplied by the coefficients of $1/16$–$3/16$ as shown in FIG. 16, and the multiplied errors are added together to provide a weighted average value of binarization errors. The weighted average value is added to a density value of a pixel of interest by adder 601. An adder of 9–13 bits is generally required as error weighting filter 606.

FIG. 17 shows an output image sample by the circuit in FIG. 16.

However, the conventional image processing apparatus above has drawbacks described below.

(1) The effect of masking a nonuniform pitch, which causes overlapped or gapped pitches, of a printer is low because output patterns are irregular.

In the case of a laser beam printer, the nonuniform pitch of a printer mainly occurs when the inclination adjustment of a polygon mirror is insufficient or when the stability of paper feed is poor, and the nonuniform pitch occurs vertically to a sub scanning direction. In the case of an ink jet printer, the nonuniform pitch occurs when the accuracy of line feed of a printing head is insufficient or when the stability of paper feed is poor, and it also occurs vertically to a sub scanning direction.

(2) An irregular texture unique to a highlight portion of a photographic image is generated.

This problem is unique to the error diffusion method. An example is found in an irregular dot arrangement (texture) at a lower portion of the image (lower portion of a notebook image) shown in FIG. 17.

(3) A hardware circuit for a feedback process cannot be formed by a synchronous circuit, and a higher speed is difficult to achieve as the number of gradation levels which can be represented is made larger.

Since the processing time of an adder generally becomes longer as the number of bits is larger, the processing speed becomes lower as the bit width of an input multi-valued image is made larger (that is, the number of gradation levels is made larger) in the error diffusion binarization method.

In order to solve the problems of (1) and (2) described above, a method has been proposed which periodically varies a binarization threshold in error diffusion binarization by a dither matrix having a size of S×S.

FIG. 18 is a block diagram showing a structure of an image processing apparatus adopting such a method.

This apparatus is different from the apparatus shown in FIG. 16 in that a threshold that is input to comparator 703 is varied by a variable threshold matrix (dither matrix) 702. In other words, this apparatus is formed so that the count values of a main scanning direction counter and a sub scanning direction counter are input to variable threshold matrix 702 and a threshold that is input to comparator 703 is varied as pixels are scanned.

variable threshold matrix 702 has a size of S×S=4×4 and the average value of thresholds is "128" that is a middle density value when an input multi-valued image has 8 bits.

When a threshold is varied by variable threshold matrix 702 in this manner, a periodic line component is added to both of main/sub scanning directions and a multi-line effect can be obtained vertically to the main scanning direction.

Since addition of a periodic line component (multi-line) vertically to the main scanning direction is effective to mask a nonuniform pitch of a printer, the nonuniform pitch of a printer can be masked to some extent by the circuit shown in FIG. 18.

As a circuit having a similar effect to the circuit in FIG. 18, a technique has been proposed which periodically adds a bias value to a density value of a pixel of an input multi-valued image.

FIG. 19 is a block diagram showing a structure of an image processing apparatus adapting such a technique.

In this apparatus, a periodically increasing/decreasing bias value is added to a density value of a pixel of interest of an input multi-valued image by an adder 801.

The bias values are stored in variable bias value matrix 802. The total of bias values stored in variable bias value matrix 802 is set to "0." In this apparatus, the size of variable bias value matrix 802 is S×S=4×4.

FIG. 20 shows an output image sample when a threshold (or bias value) is periodically varied by the image processing apparatus in FIG. 18 or FIG. 19 above.

Since a threshold or bias value is varied by the periodic dither matrix having a size of S×S in these apparatuses, a periodic line component is added to both of main/sub scanning directions of an image, and a multi-line effect can be obtained by a component vertical to the main scanning direction. It can be seen from a portion of the image where a notebook is printed on the lower side (a lower portion of the notebook, especially) an irregular dot arrangement (texture) is reduced compared with the image (FIG. 17) processed by the typical error diffusion method.

In the image shown in FIG. 20, however, resolution is slightly lowered in both of the main/sub scanning directions.

This is because a periodic component vertical to the sub scanning direction is also unnecessarily added, although a periodic component vertically to the main scanning direction has only to be added to attain a line effect.

In any of the apparatuses shown in FIGS. 18 and 19 above, the bit width of an input multi-valued image is the same as in the apparatus shown in FIG. 16, and therefore the apparatuses cannot have a higher operating speed.

As an apparatus for solving the problems (1)–(3) described above, an image processing apparatus having the structure shown in FIG. 21 has been proposed.

In this apparatus, an 8-bit input multi-valued image, for example, is made a 4-bit multi-valued dither image, for example, by a dither matrix with a size of S×S, and the image is further subjected to error diffusion binarization. Since a dither component is added in the process of multi-value dithering, and error diffusion binarization is carried out with the bit number approximately half the conventional number according to the circuit, an irregular texture can be reduced, a higher speed of the apparatus can be attained, and lower cost of the apparatus can be achieved by reducing memories.

Referring to FIG. 21, the gradation conversion table 901 is an 8 bit→8 bit gradation conversion table formed of an ROM, for example. When the error diffusion binarization process to be carried out at a subsequent stage is performed on an input 4-bit image, hexadecimal values from 00h to FFh that can be taken by the image are rounded to values from 00h to F0h by gradation conversion table 901.

A threshold matrix 902 outputs a threshold according to addresses given by a main scanning direction counter (that increments from 0 to 3 and is reset at 4) and a sub scanning direction counter (that increments from 0 to 3 and is reset at 4).

A comparator 903 compares the threshold from threshold matrix 902 and the value of less significant 4 bits (density value L4) of the 8-bit image that has the rounded value of F0h at most. When the value of least significant 4 bits is equal to or larger than the threshold, "1" is output. Otherwise, "0" is output.

An adder 904 adds more significant 4 bits of the 8-bit image data that takes the value of F0h at most and an output from comparator 903.

This output becomes a 4-bit multi-valued dither image and it is input to an adder 905. After adder 905, the same process as in FIG. 16 is performed.

FIG. 22 is a diagram for describing the function of threshold matrix 902 in FIG. 21. In the figure, a white circle indicates a pixel of which output is "0" and a black circle indicates a pixel of which output is "1."

FIG. 22 shows a case where density value L4 that is input to comparator 903 is "0"–"15" for all pixels. When density value L4 is at least a corresponding threshold of the threshold matrix (dither matrix), "1" is obtained. Otherwise, "0" is obtained. Accordingly, as density value L4 increases, a pixel to be "1" increases outward from the matrix center. In short, the dither matrix is arranged in a dot concentration manner.

FIG. 23 shows a sample image output from the apparatus in FIG. 21. It can be seen from a portion where a notebook is printed on the lower side of the image (a lower portion of the notebook) that an irregular dot arrangement (texture) is reduced compared with the image, shown in FIG. 17, processed by the typical error diffusion method.

Since the S×S dither matrix is still adopted even when such an apparatus is used, however, a periodic component vertical to a sub scanning direction is also unnecessarily added.

FIG. 24 lists problems with the above described image processing apparatuses. When the typical error diffusion method shown in FIG. 16 is adopted, a texture expression at a highlight portion of an image is unsatisfactory, and the effect of masking a nonuniform pitch of a printer is not attained. Since a dither matrix is not adopted, however, resolution in a sub scanning direction is not lowered. Since a large bit width is required at all stages of image processing, problems with the processing speed and the memory cost are caused.

When the method of periodically varying a threshold as shown in FIG. 18 or the method of periodically adding a bias value as shown in FIG. 19 is adopted, an irregular texture at a highlight portion is improved by a dither matrix, and a nonuniform pitch of a printer is masked by the multi-line effect. However, resolution in a sub scanning direction is lowered by the dither matrix. Further, improvement over the typical error diffusion method is not attained in terms of the processing speed and the memory cost.

When the multi-valued dither error diffusion method shown in FIG. 21 is adopted, the effects of masking an irregular texture at a highlight portion and a nonuniform pitch of a printer are attained. However, resolution in a sub scanning direction is still lowered by the dither matrix. When the multi-valued dither matrix diffusion method is used, however, the number of gradation levels is reduced at the first stage, and therefore the processing speed is increased and the memory cost becomes lower.

However, by adopting any of the above described methods, an image processing apparatus capable of improving a highlight texture, nonuniform pitch masking, and resolution in a sub scanning direction could not be provided. Further, an image processing apparatus capable of providing good results in all of a highlight texture, nonuniform pitch masking, resolution in a sub scanning direction, processing speed, and memory cost could not be provided.

SUMMARY OF THE INVENTION

Accordingly, an object of the present invention is to provide an image processing apparatus capable of providing superior results in all of a texture at a highlight portion, nonuniform pitch masking, and resolution in a sub scanning direction. Another object of the present invention is to provide an image processing apparatus providing superior results in terms of the processing speed and the memory cost.

In order to attain the objects described above, an image processing apparatus according to one aspect of the present invention includes a binarization circuit for comparing a prescribed threshold and a density value of one pixel of an input image to obtain a density value of a pixel of a corresponding binary output image, an error calculation circuit for calculating as an error a difference between the density value of the one pixel of the input image and the density value of the pixel of the corresponding binary output image, an error diffusion circuit for diffusing the calculated error to pixels peripheral to the pixel of the input image, and a variation circuit for periodically varying the threshold by a dither matrix, the dither matrix having its first periodic component vertical to a main scanning direction stronger than its periodic component vertical to a sub scanning direction.

According to another aspect of the present invention, an image processing apparatus includes a binarization circuit for comparing a prescribed threshold and a density value of one pixel of an input image to obtain a density value of a pixel of a corresponding binary output image, an error calculation circuit for calculating as an error a difference between the density value of the one pixel of the input image and the density value of the pixel of the corresponding binary output image, an error diffusion circuit for diffusing the calculated error to pixels peripheral to the pixel of the input image, an adding circuit for generating a bias value periodically varied by a dither matrix and adding the bias value to the density value of the pixel of the input image, the dither matrix has its periodic component vertical to a main scanning direction stronger than its periodic component vertical to a sub scanning direction.

According to still another aspect of the present invention, an image processing apparatus includes a gradation conversion circuit for converting an input image having an N-bit gradation into an image having an M-bit gradation using a first threshold where M bits are smaller than N bits, a variation circuit for periodically varying the first threshold by a dither matrix, the dither matrix having its periodic component vertical to a main scanning direction stronger than its periodic component vertical to a sub scanning direction, a binarization circuit for comparing a density value of one pixel of the image having the M-bit gradation and a second threshold to obtain a density value of a pixel of a corresponding binary output image, an error calculation circuit for calculating as an error a difference between the density value of one pixel of the image having the M-bit gradation and the density value of the pixel of the corresponding binary output image, and an error diffusion circuit for diffusing the calculated error to pixels peripheral to the pixel of the image having the M-bit gradation.

According to still another aspect of the present invention, a method of outputting a binary image by processing an input image includes the steps of comparing a prescribed threshold and a density value of one pixel of an input image to obtain a density value of a pixel of a corresponding binary output image, calculating as an error a difference between the density value of the one pixel of the input image and the density value of the pixel of the corresponding binary output image, diffusing the calculated error to pixels peripheral to the pixel of the input image, and periodically varying the threshold by a dither matrix having its periodic component vertical to a main scanning direction stronger than its periodic component vertical to a sub scanning direction.

According to still another aspect of the present invention, a method of outputting a binary image by processing an input image includes the steps of comparing a prescribed threshold and a density value of one pixel of an input image to obtain a density value of a pixel of a corresponding binary output image, calculating as an error a difference between the density value of the one pixel of the input image and the density value of the pixel of the corresponding binary output image, diffusing the calculated error to pixels peripheral to the pixel of the input image, and generating a bias value periodically varied by a dither matrix having its periodic component vertical to a main scanning direction stronger than its periodic component vertical to a sub scanning direction and adding the bias value to the density value of the pixel of the input image.

According to still another aspect of the present invention, a method of outputting a binary image by processing an input image includes the steps of converting an input image having an N-bit gradation into an image having an M-bit gradation using a first threshold where M bits are smaller than N bits, periodically varying the first threshold by a dither matrix having its periodic component vertical to a main scanning direction stronger than its periodic component vertical to a sub scanning direction, comparing a density value of one pixel of the image having the N-bit gradation and a second threshold to obtain a density value of a pixel of a corresponding binary output image, calculating as an error a difference between the density value of the one pixel of the image having the M-bit gradation and the density value of the pixel of the corresponding binary output image, and diffusing the calculated error to pixels peripheral to the pixel of the image having the M-bit gradation.

According to the present invention, image processing that is advantageous for all of the texture at an image highlight portion, the masking effect for a nonuniform pitch, and the resolution in a sub scanning direction can be made possible by a matrix having its periodic component vertical to a main scanning direction stronger than its periodic component vertical to a sub scanning direction.

According to the present invention, an image processing apparatus capable of providing superior results in terms of the processing speed and the memory cost can also be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a chart for describing the effects in the first to third embodiments.

FIG. 21 is a block diagram of a binarization circuit as a third improvement on the circuit in FIG. 16.

FIG. 22 shows an output result of comparator 903 in FIG. 21.

FIG. 23 shows an output image of the circuit in FIG. 21.

FIG. 24 is a chart for describing the features of the circuits in FIGS. 16, 18, 19 and 21.

DESCRIPTION OF THE PREFERRED EMBODIMENTS

First Embodiment

Figure 1:
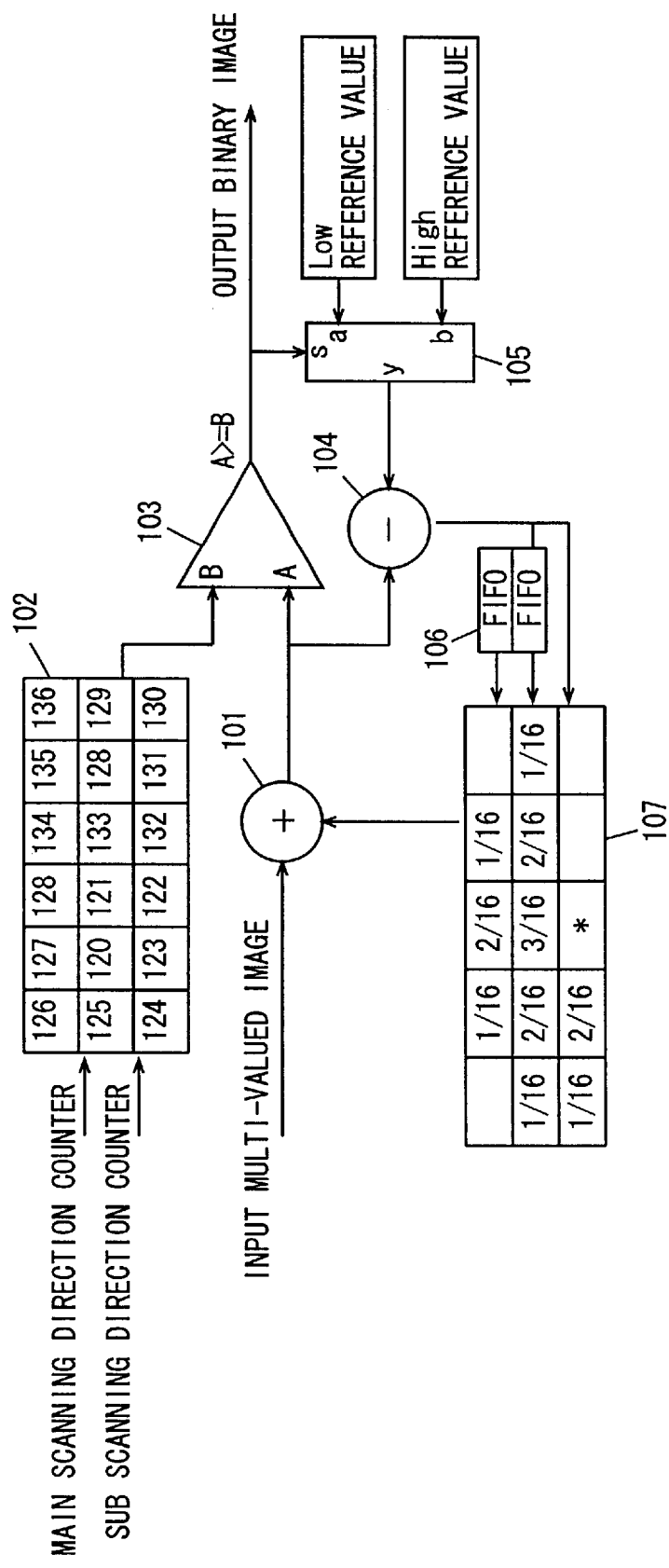
FIG. 1 is a block diagram showing a binarization circuit of an image processing apparatus in a first embodiment of the present invention.
Figure 2:
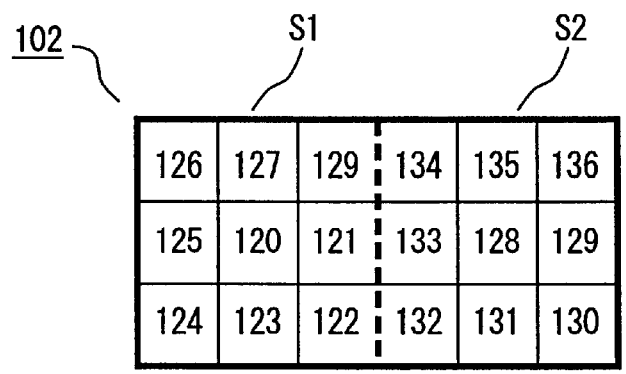
FIG. 2 is an enlarged diagram of variable threshold matrix 102 in FIG. 1.

FIG. 1 is a block diagram of a binarization circuit included in an image processing apparatus in a first embodiment of the present invention, and FIG. 2 is an enlarged diagram of a variable threshold matrix 102 in FIG. 1.

Figure 18:
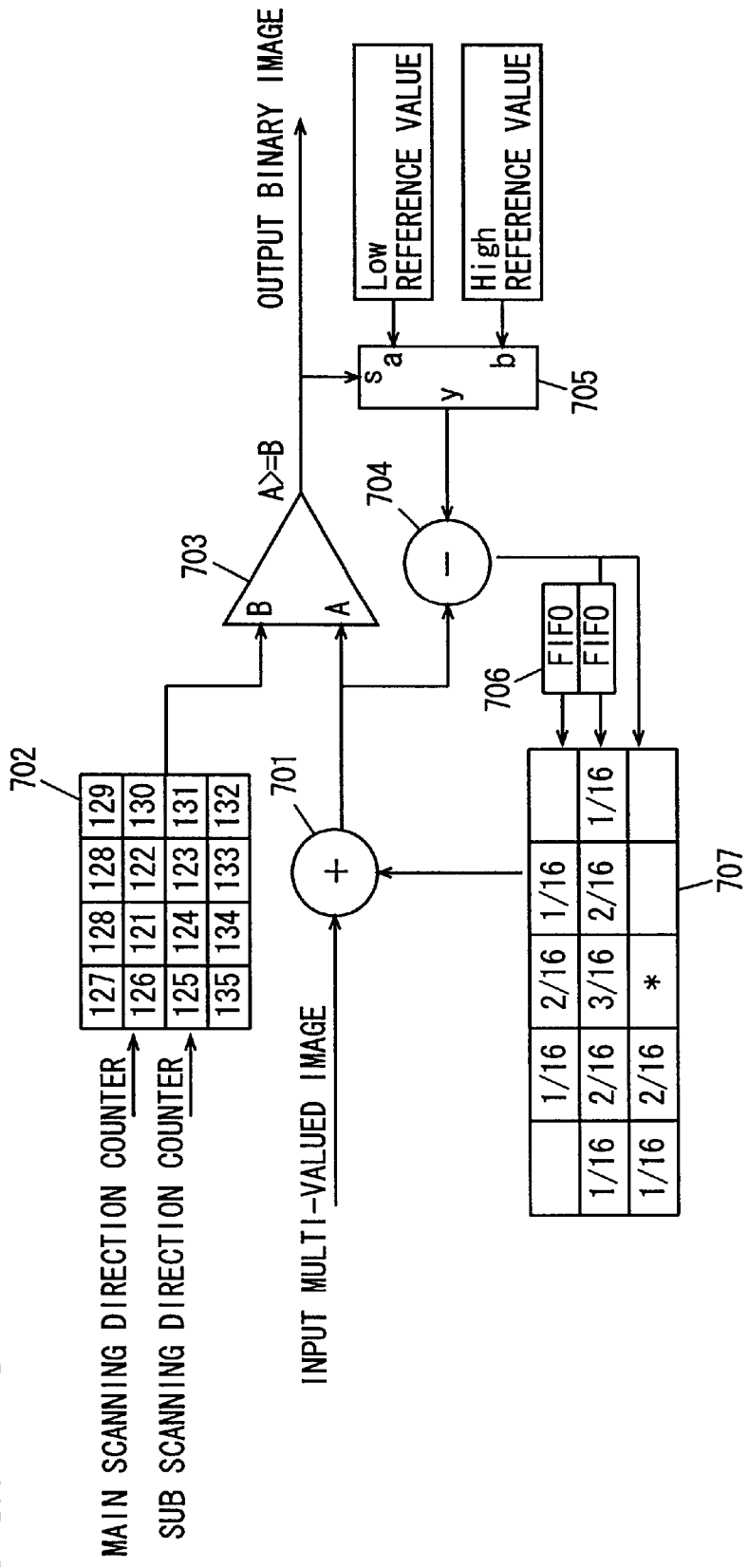
FIG. 18 is a block diagram showing a structure of a binarization circuit as a first improvement on the circuit in FIG. 16.

The binarization circuit is characterized in that variable threshold matrix (dither matrix) 102 is formed of six pixels in a main scanning direction and three pixels in a sub scanning direction unlike the circuit shown in FIG. 18. More specifically, in variable threshold matrix 102, a plurality of (here, two in the main scanning direction) sub matrices with a size of 3×3 are arranged, and the thresholds of respective sub matrices are arranged in a dot concentration manner.

The binarization circuit outputs an 8-bit (256 gradation levels) input multi-valued image as a 1-bit image.

An adder 101 adds a weighted binarization error to a density value of one pixel of an input multi-valued image to correct an error. A comparator 103 compares a threshold output from variable threshold matrix 102 and the density value of one pixel of the input multi-valued image which is error-corrected, and outputs "1" when the density value is at least the threshold.

Variable threshold matrix 102 is formed of a memory of 18 words, for example, and receives an address calculated from a main scanning direction address counter (that increments from 0 to 5 and is reset at 6) and a sub scanning direction address counter (that increments from 0 to 2 and is reset at 3). A threshold that corresponds to this address is output from variable threshold matrix 102.

Figure 3:
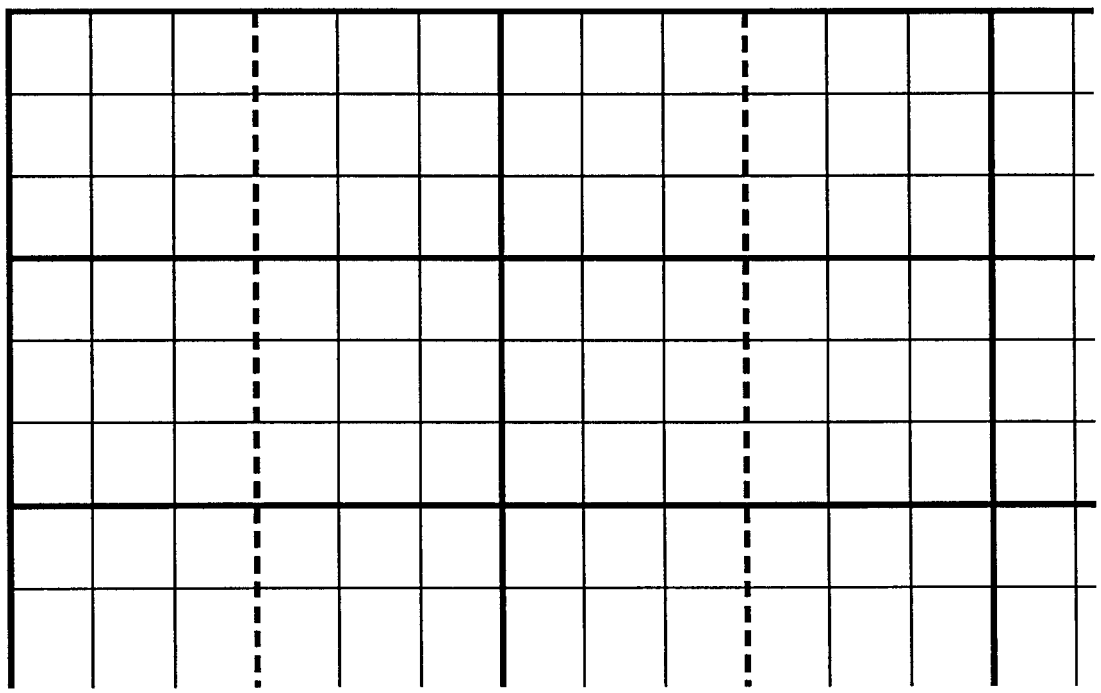
FIG. 3 is a diagram for describing the correspondence between an input multi-valued image and variable threshold matrix 102.

Referring to FIG. 3, the matrix in FIG. 2 corresponds to each portion surrounded by thick lines of an input multi-valued image.

The middle value of the thresholds included in variable threshold matrix 102 is "128", and it is adopted to vary ±8 at most. The total average value of the thresholds included in variable threshold matrix 102 is "128." The average value of the thresholds included in a left sub matrix S1 with a size of 3×3 that forms variable threshold matrix 102 is "124," and the average value of the thresholds included in a right sub matrix S2 with a size of 3×3 is "132." In other words, right sub matrix S2 is set to have a larger average value of the thresholds than left sub matrix S1.

A selector 105 selects one of two reference values (error calculation reference values) of High and Low, which are set in advance such as by a CPU, in accordance with an output from comparator 103. A subtracter 104 calculates a difference (that is, a binarization error) between the error calculation reference value and the density value of one pixel of the error-corrected input multi-valued image. An error memory 106 is formed of an FIFO memory for holding one to several lines of binarization errors.

An error weighting filter 107 calculates a weighted average value of a plurality of binarization errors held in error memory 106.

The features of the binarization circuit in this embodiment will be described in the following.

Figure 4:
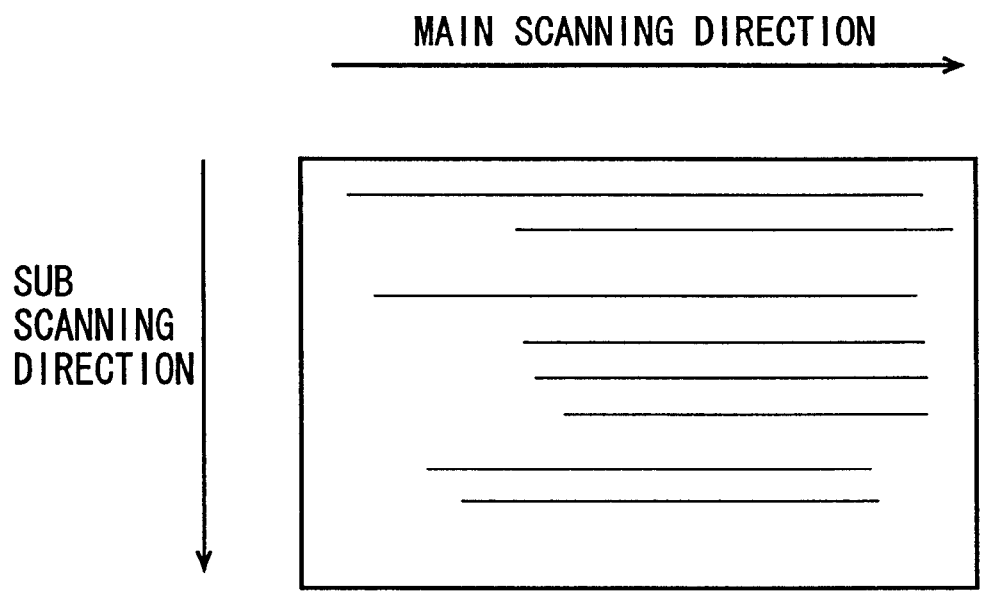
FIG. 4 is a diagram for describing a nonuniform pitch in sub scanning.
Figure 5:
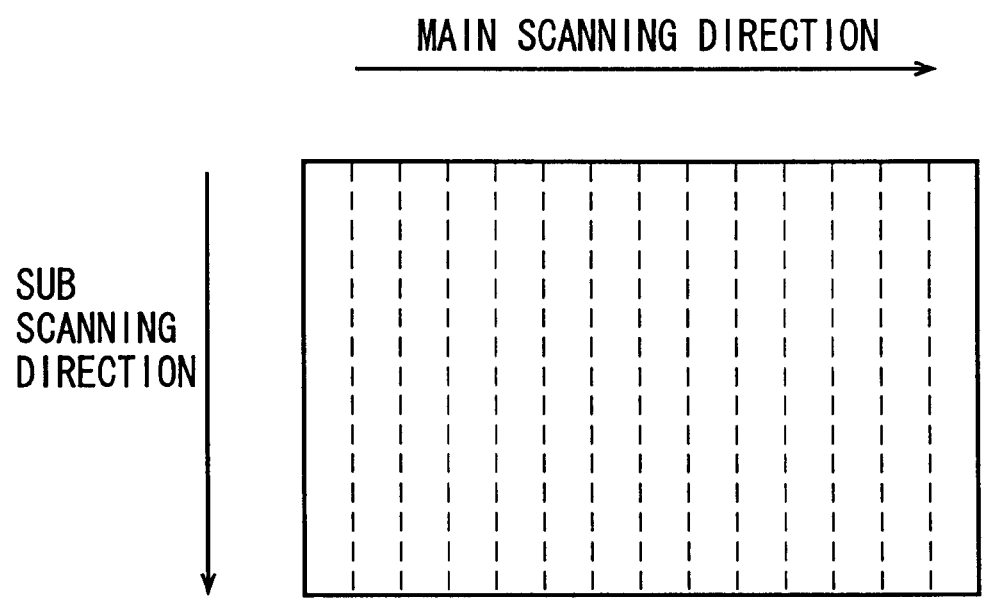
FIG. 5 is a diagram for describing a multi-line vertical to a main scanning direction.

A nonuniform pitch in a sub scanning direction caused such as by unstable paper feed of a printer occurs in an image as lines vertical to the sub scanning direction as shown in FIG. 4. In order to mask such a nonuniform pitch, provision of a multi-line vertical to the main scanning direction as shown in FIG. 5 is effective. When such a multi-line is used, however, resolution in the main scanning direction is slightly lowered.

Figure 6:
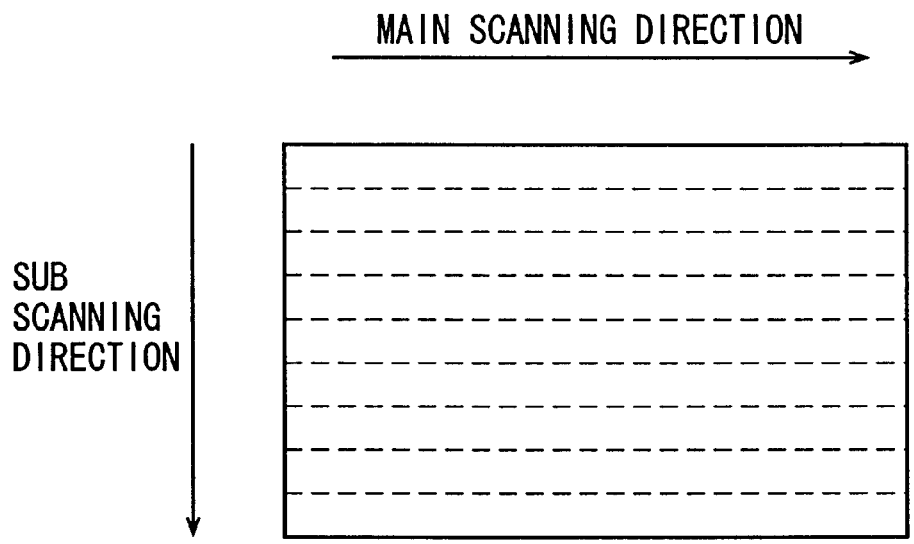
FIG. 6 is a diagram for describing a multi-line vertical to a sub scanning direction.

However, provision of a multi-line vertical to the sub scanning direction as shown in FIG. 6 is not effective for a nonuniform pitch. When such a multi-line vertical to the sub scanning direction is provided, resolution in the sub scanning direction is slightly lowered.

Figure 19:
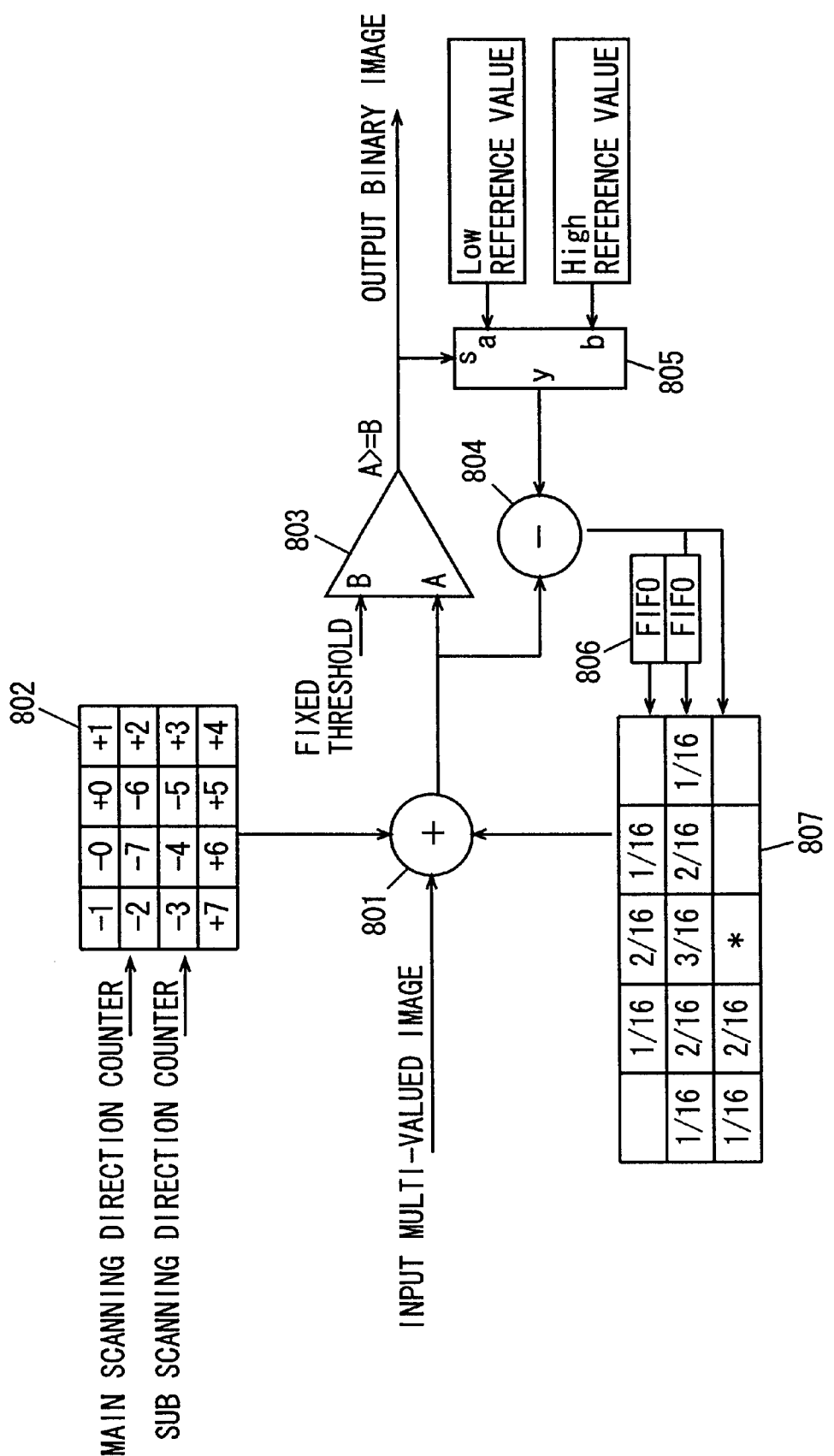
FIG. 19 is a block diagram showing a structure of a binarization circuit as a second improvement on the circuit in FIG. 16.
Figure 20:
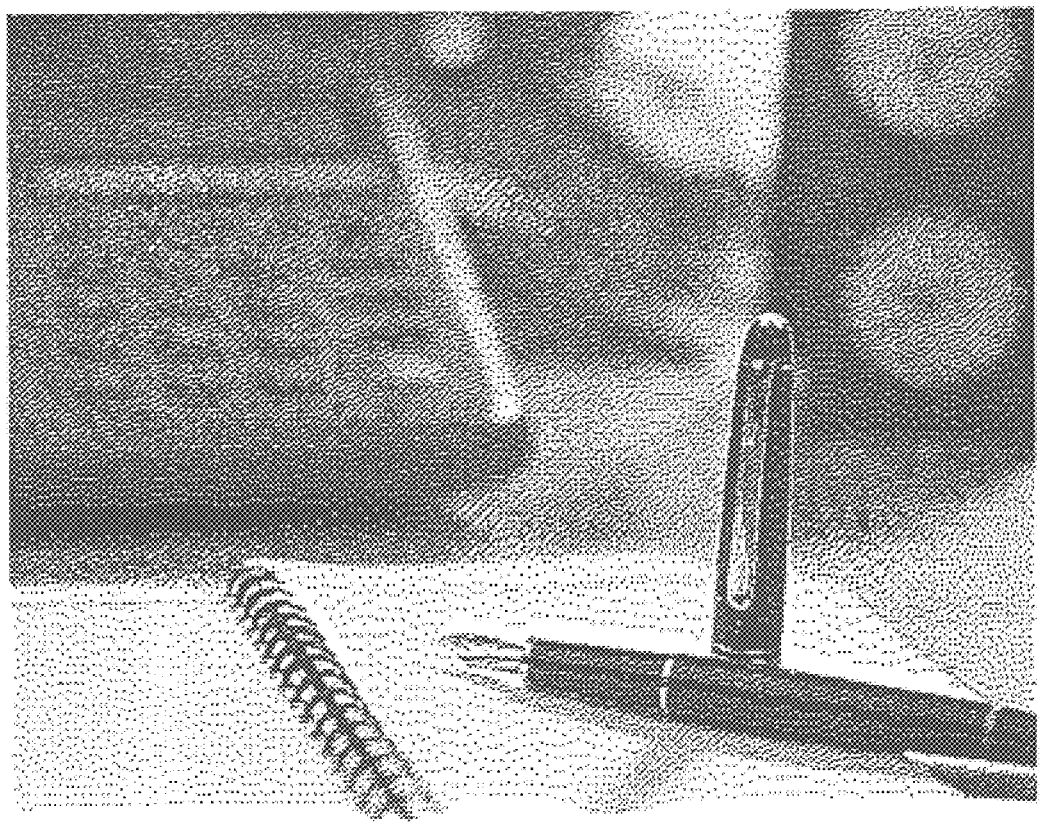
FIG. 20 shows an output image of the circuit in FIG. 18 or 19.

In the circuits shown in FIGS. 18, 19 and 21, multi-lines of both FIGS. 5 and 6 are provided by using a dither matrix having equal sizes in the main scanning direction and the sub scanning direction, and therefore reduction in resolution is conspicuous.

Figure 7:
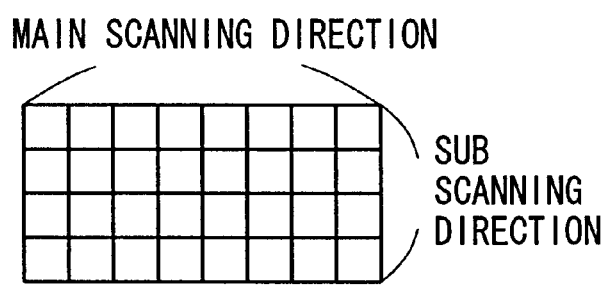
FIGS. 7 and 8 show matrices for generating a multi-line vertical to a main scanning direction.

On the contrary, in the circuit in this embodiment, only a multi-line vertical to the main scanning direction shown in FIG. 5 is provided by a dither matrix (dither matrix with a size of 6×3) having its periodic component vertical to the main scanning direction stronger than its periodic component vertical to the sub scanning direction as shown in FIG. 7 in order to prevent reduction in resolution in the sub scanning direction.

Figure 8:
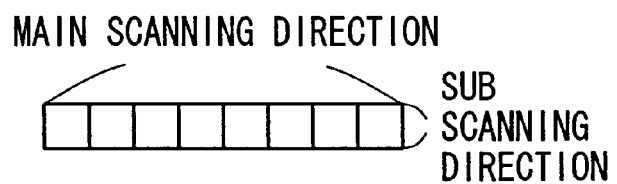

In order to provide only a multi-line vertical to the main scanning direction shown in FIG. 5, a one-dimensional matrix shown in FIG. 8 may be adopted. In this case, however, resolution balance between the main scanning direction and the sub scanning direction is deteriorated.

Accordingly, a matrix having its main scanning direction size larger than its sub scanning direction size in which at least two pixels are arranged in the sub scanning direction as shown in FIG. 7 is used in this embodiment.

Figure 9:
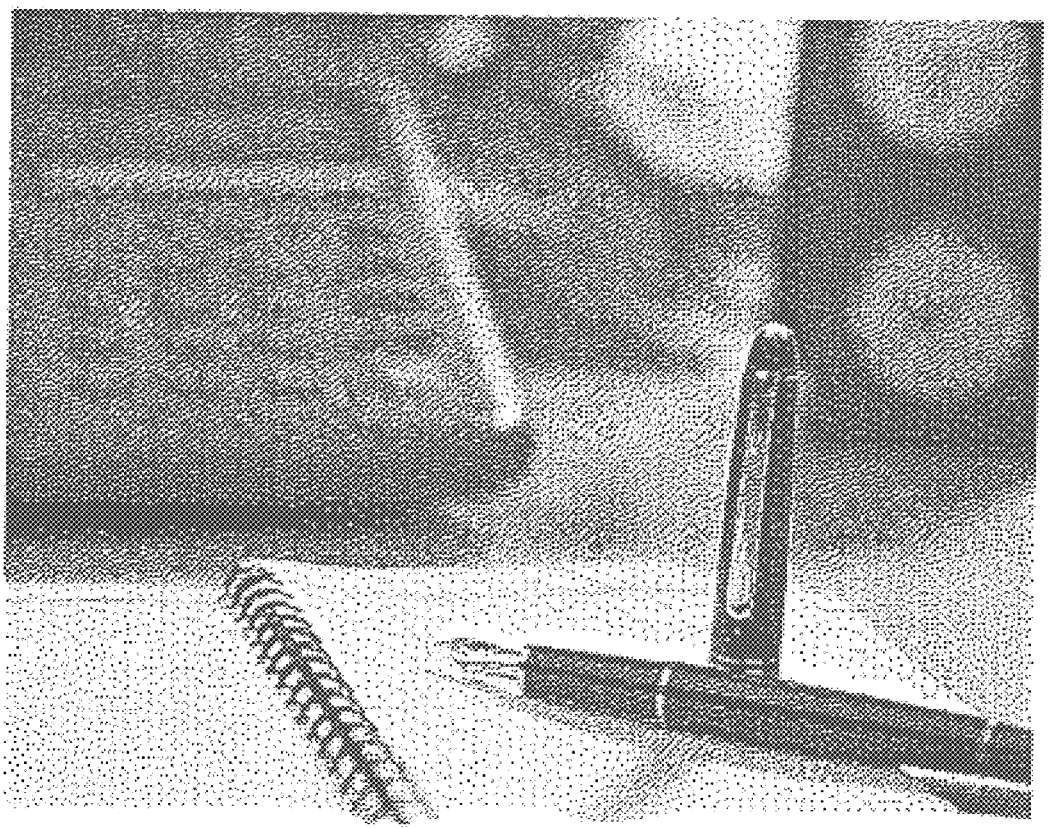
FIG. 9 shows an output result of the circuit in FIG. 1.

FIG. 9 shows an image sample output from the binarization circuit shown in FIG. 1. It can be seen from a top right portion of the figure where a speaker is printed that, due to the effect of a 6×3 dither matrix, a periodic line component is added vertically to the main scanning direction and a nonuniform pitch is masked in this embodiment. Resolution in the sub scanning direction is improved more than when a square matrix as shown in FIG. 18 is used.

Second Embodiment

Figure 10:
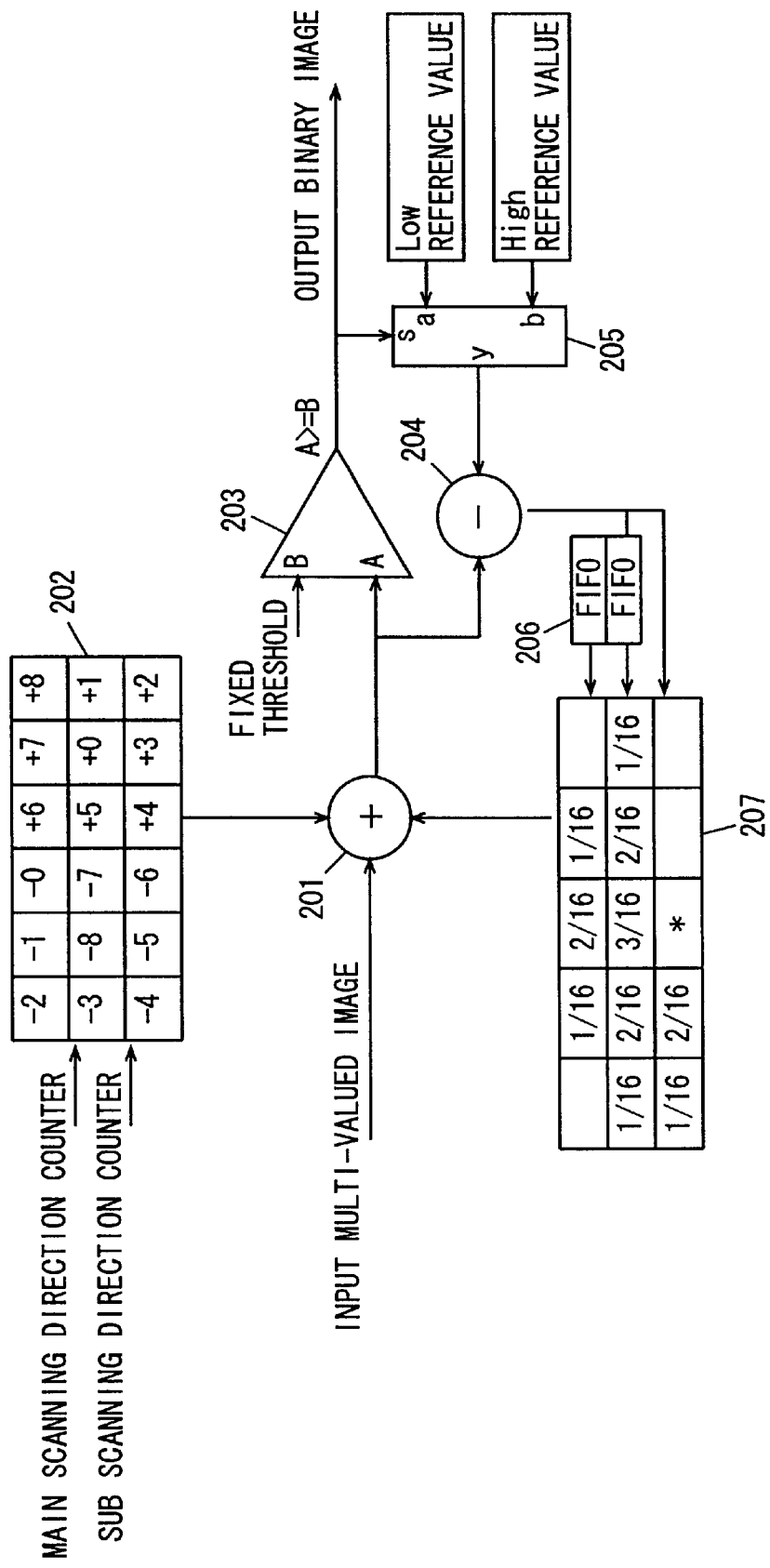
FIG. 10 is a block diagram of a binarization circuit of an image processing apparatus in a second embodiment of the present invention.

FIG. 10 is a block diagram of a binarization circuit included in an image processing apparatus in a second embodiment of the present invention.

Referring to the figure, the binarization circuit processes an 8-bit (256 gradation levels) input multi-valued image and outputs a binary image.

In this embodiment, a matrix that includes two 3×3 sub matrices are arranged in a main scanning direction is used as a variable bias value matrix 202 unlike the circuit shown in FIG. 19.

An adder 201 is used to correct an error by adding a weighted binarization error and a density value of one pixel of an input multi-valued image. Variable bias value matrix 202 is a matrix having a size of 6 in the main scanning direction and 3 in the sub scanning direction, and generates a corresponding bias value in accordance with the values of a main scanning direction counter and a sub scanning direction counter.

Variable bias value matrix 202 is formed of a memory of 18 words, for example, receives an address calculated from the main scanning direction counter (that increments from 0 to 5 and is reset at 6) and the sub scanning direction counter (that increments from 0 to 2 and is reset at 3), and outputs a bias value corresponding to the address.

The bias value is adapted to vary ±8 at most from a medium value 0, and the average value in all arrangements is 0. The average value in the left sub matrix with a size of 3×3 is −4, and the average value in the right sub matrix arrangement with a size of 3×3 is +4. In this manner, the right sub matrix is set to have a larger average value than the left sub matrix.

A comparator 203 compares the density value of one pixel of the error-corrected input multi-valued image and a fixed threshold, and produces a binary output value. A selector 205 selects one of two error calculation reference values of High and Low, which are set in advance such as by an MPU, in accordance with an output from comparator 203.

A subtracter 204 calculates a difference (that is, a binarization error) between the above described error calculation reference value and the density value of one pixel of the error-corrected multi-valued input image.

An error memory 206 holds one to several lines of the above described binarization errors. An error weighting filter 207 calculates a weighted average value of a plurality of binarization errors that are held in memory 206.

Similar effects to those of the circuit in the first embodiment can be attained by the circuit shown in FIG. 10. That is, the matrix arrangement causes a multi-line as a periodic line component vertical to the main scanning direction and that masking effect for a nonuniform pitch. Resolution in the sub scanning direction is improved more than when a square matrix is used.

Third Embodiment

Figure 11:
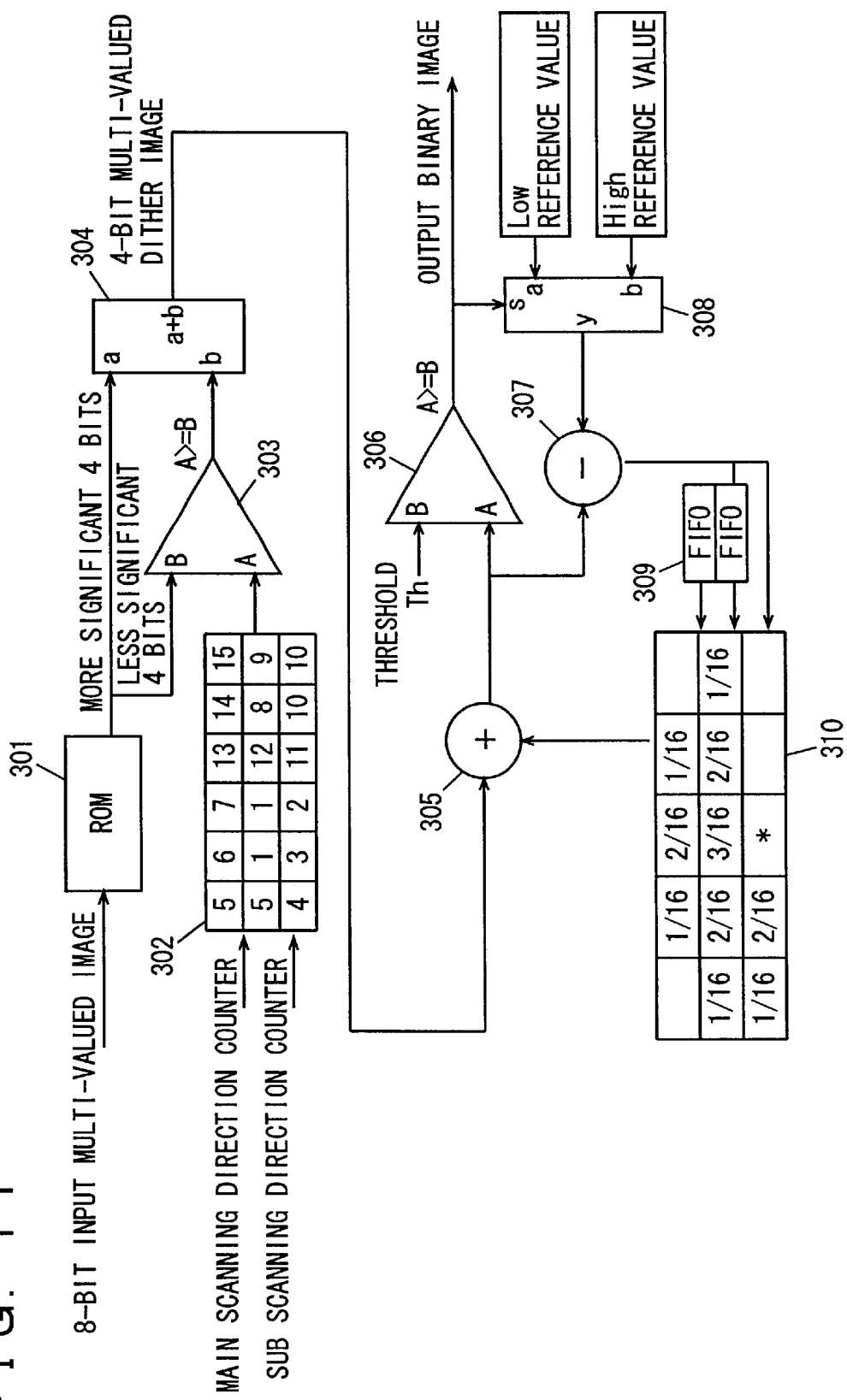
FIG. 11 is a block diagram of a binarization circuit of an image processing apparatus in a third embodiment of the present invention.

FIG. 11 is a block diagram of a binarization circuit included in an image processing apparatus in a third embodiment of the present invention.

The circuit outputs a binary image by processing an 8-bit (256 gradation levels) input multi-valued image.

Referring to the figure, the gradation conversion table 301 is an 8 bits→8 bits gradation conversion table formed of an ROM, for example. When error diffusion binarization at a subsequent stage is processed on an input 4-bit image, a table for rounding the density values of hexadecimal 00h–FFh that can be taken by a pixel to 00h–F0h is employed.

A threshold matrix 302 includes a threshold arrangement with a size of 6×3, and outputs a corresponding threshold in accordance with the values of a main scanning direction counter and a sub scanning direction counter. A comparator 303 compares less significant 4 bits of a gradation output from gradation conversion table 301 and the threshold output from threshold matrix 302, and outputs the comparison result. An adder 304 adds more significant 4 bits of a density value output from gradation conversion table 301 and the output from comparator 303. Accordingly, a value output from adder 304 becomes a 4-bit multi-valued dither image.

Threshold matrix 302 is formed of a memory of 18 words, for example, where one word is 4 bits, receive an address calculated from the main scanning direction counter (that increments from 0 to 5 and is reset at 6) and the sub scanning direction counter (that increments from 0 to 2 and is reset at 3), and outputs a threshold corresponding to the address.

Threshold arrangement data is adapted to vary ±7 at most from a middle value 8. The average value of the all arrangement values is 8 when it is made an integer.

The average value of thresholds in the left 3×3 sub matrix included in threshold matrix 302 is 4 when it is made an integer, and the average value of thresholds in the right 3×3 sub matrix is 12 when it is made an integer. In other words, the right sub matrix is set to have a larger threshold average than the left sub matrix.

An adder 305 corrects an error by adding a weighted binarization error to a density value of one pixel of an input 4-bit multi-valued dither image. A comparator 306 compares a fixed threshold and the density value of one pixel of the error-corrected 4-bit multi-valued dither image, and produces a binary output value.

A selector 308 selects one of two error calculation reference values of High and Low, which are set in advance such as by an MPU, in accordance with an output from comparator 306.

A subtracter 307 calculates a difference (that is, a binarization error) between the above described error calculation reference value and the density value of one pixel of the error-corrected input multi-valued image.

An error memory 309 is an FIFO memory for holding one to several lines of the above described binarization errors.

An error weighting filter 310 calculates a weighted average value of a plurality of the above described binarization errors that are held in memory 309.

Figure 12:
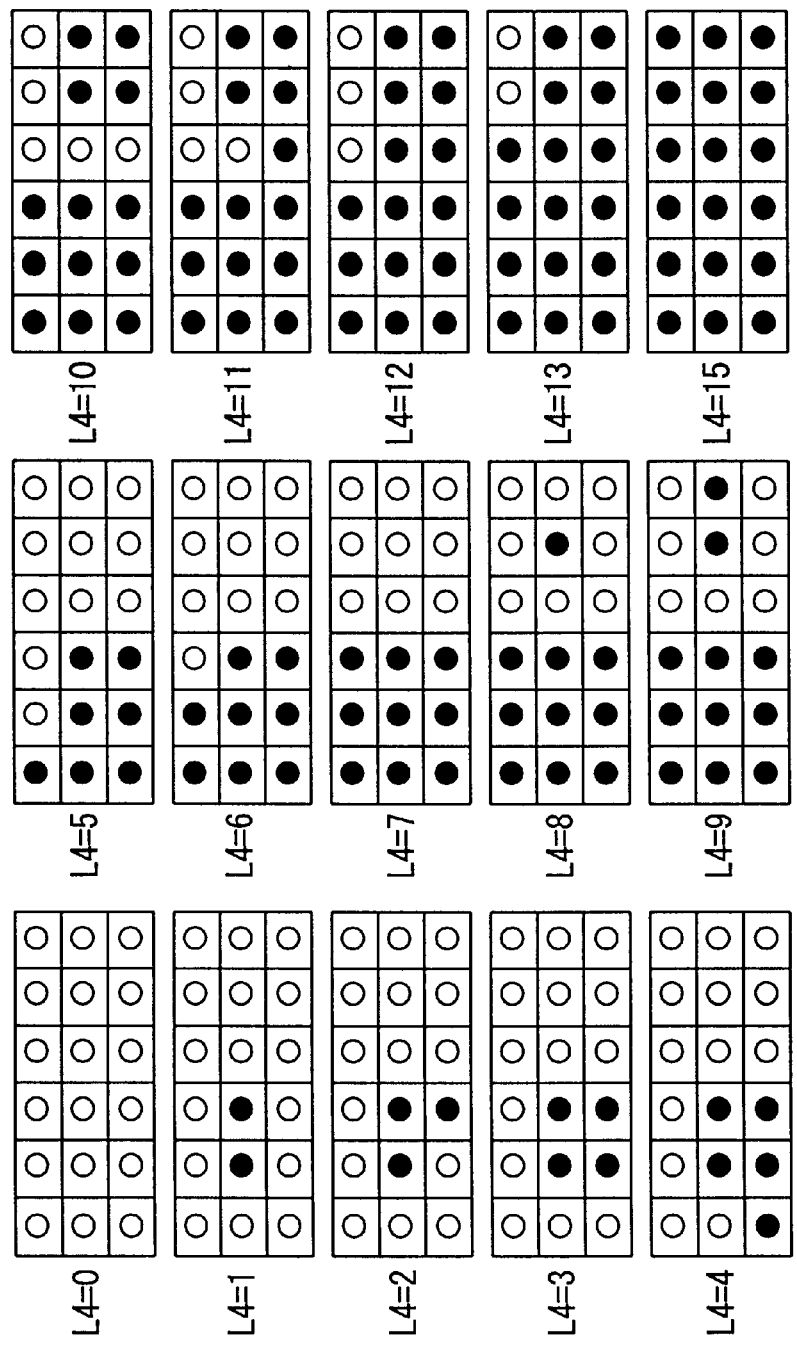
FIG. 12 is a diagram for describing an output from comparator 303 in FIG. 11.

FIG. 12 shows the relations among threshold matrix 302, data L4 of less significant 4 bits input to comparator 303, and an output from comparator 303 in FIG. 11. In the figure, a white circle denotes "0" and a black circle denotes "1."

Left and right sub dither matrices included in the dither matrix each have a threshold arrangement arranged in a dot concentration manner. The threshold average value is smaller in the left sub matrix than in the right sub matrix. Accordingly, with the increase in the value of data L4 of less significant 4 bits that is input to comparator 303, a "1" pixel first appears and increases from the center to the periphery of the left sub matrix, and a "1" pixel then appears and increases from the center to the periphery of the right sub matrix.

Figure 13:
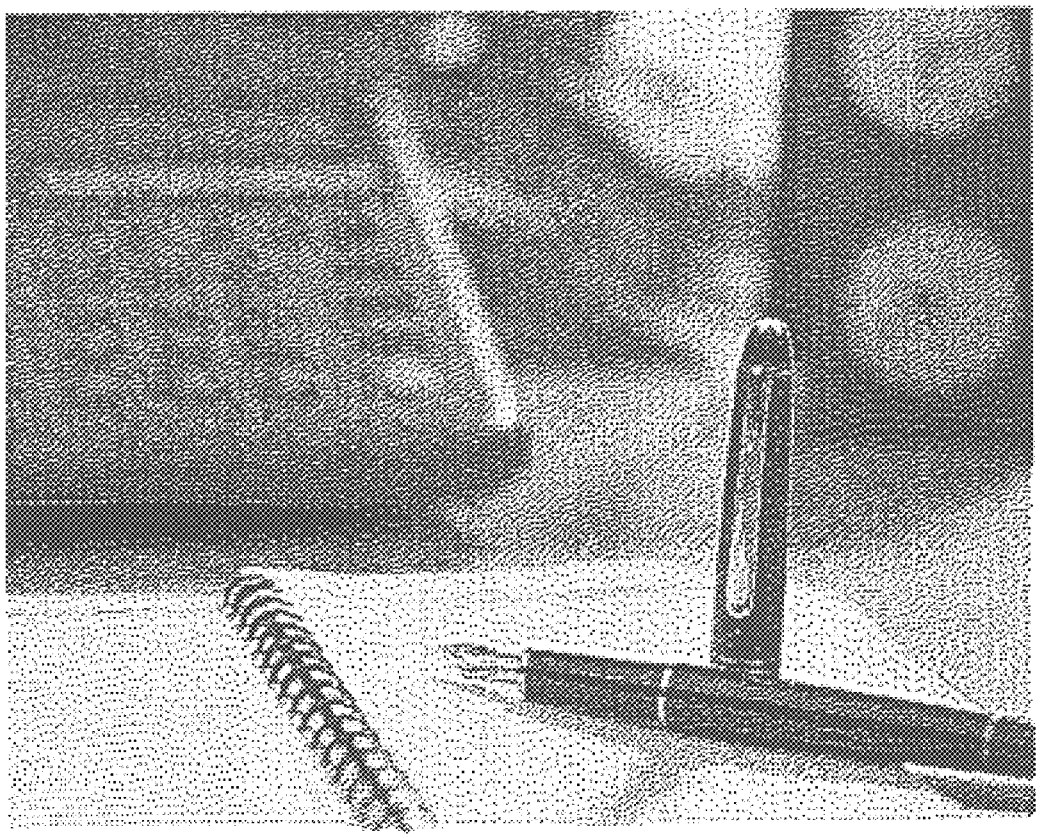
FIG. 13 shows an output image in the third embodiment.
Figure 15:
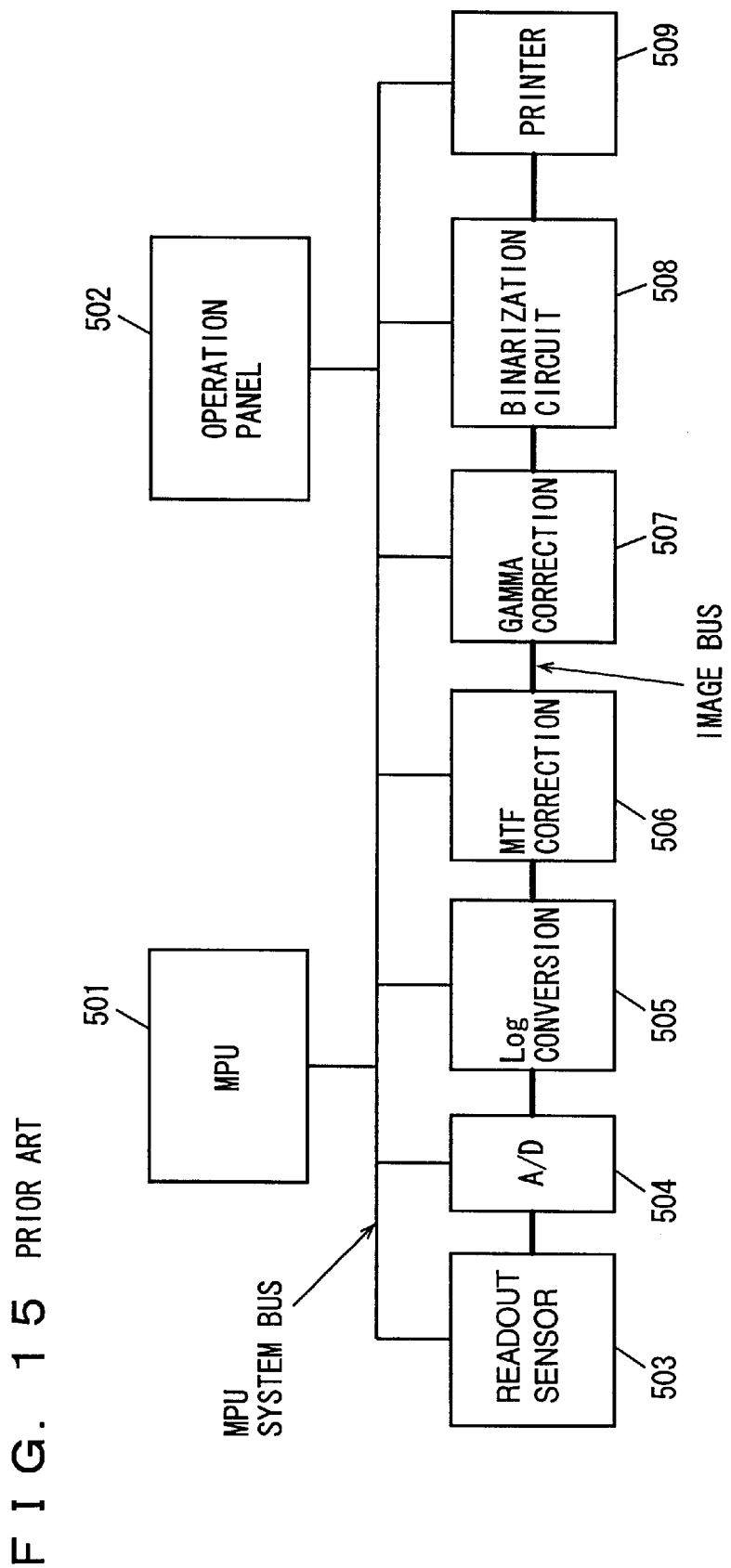
FIG. 15 is a block diagram showing a structure of a conventional image processing apparatus for error diffusion binarization processing.
Figure 16:
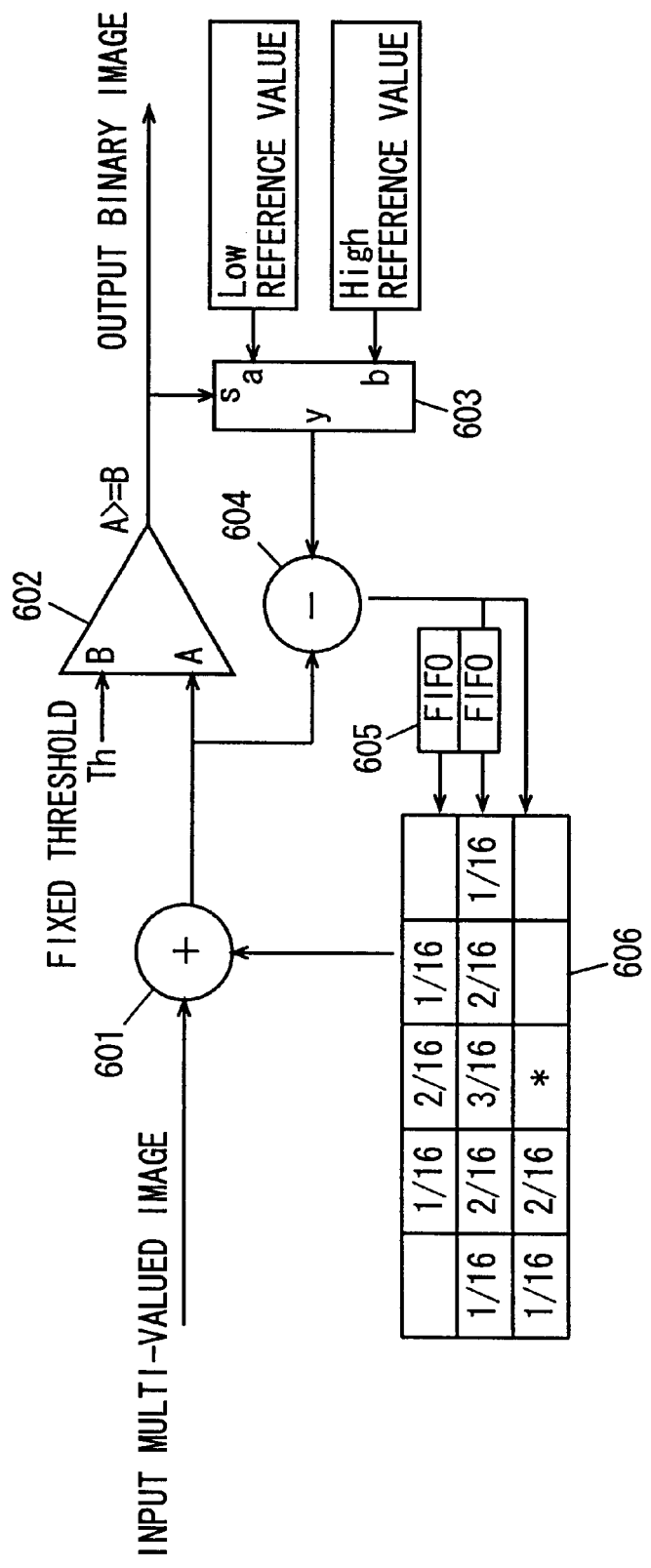
FIG. 16 is a block diagram showing a specific structure of binarization circuit 508 in FIG. 15.
Figure 17:
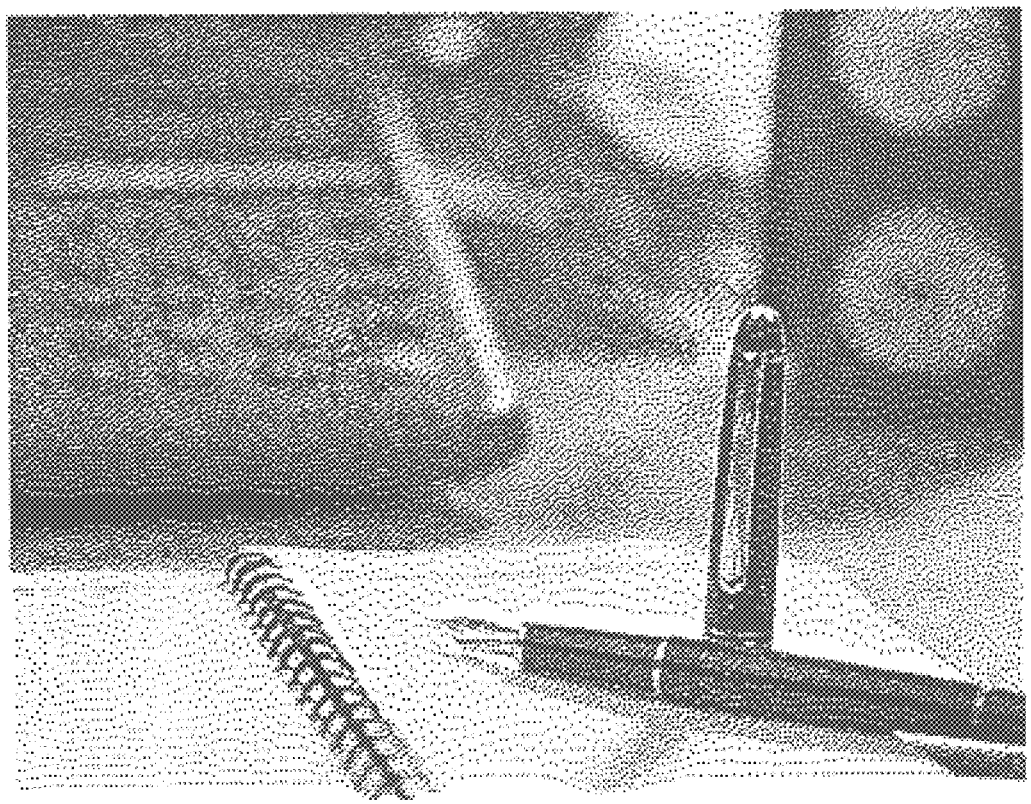
FIG. 17 shows an output image of the circuit in FIG. 16.

FIG. 13 shows an image sample output from the binarization circuit in this embodiment.

It can be seen from the top right portion of the figure where a speaker is printed that a certain multi-line as a periodic line component is added vertically to a main scanning direction by the dither matrix and the effect of masking a nonuniform pitch is caused. Resolution in a sub scanning direction is improved more than when a square matrix is used. Since the number of input bits in the error diffusion portion of the circuit in this embodiment is 4 bits, processing faster than the first and second embodiments is made possible. The memory amount and cost can be reduced compared with the first and second embodiments, and an approximately same image quality can be attained.

FIG. 14 is a chart for describing the effects in the first to third embodiments.

Referring to the figure, the dither matrix can prevent generation of an irregular textures at a highlight portion of an image in the first embodiment. When a multi-line vertical to a main scanning direction is applied, the effect of masking a nonuniform pitch is obtained. Since a multi-line vertical to a sub scanning direction is not generated, resolution in the sub scanning direction can be maintained. However, both of the processing speed and the memory cost cannot be improved over the conventional art.

In the second embodiment, the results are almost the same as the first embodiment.

In the third embodiment, superior effects almost the same as the first and second embodiments can be attained in any of a texture at a highlight portion, nonuniform pitch masking, and resolution in a sub scanning direction. In the third embodiment, the number of input bits in the error diffusion portion can be reduced to 4 bits, for example, and therefore both of the processing speed and the memory cost can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a binarization circuit for comparing a prescribed threshold and a density value of one pixel of an input image to obtain a density value of a pixel of a corresponding binary output image;
   an error calculation circuit for calculating as an error a difference between the density value of the pixel of said input image and the density value of the pixel of said corresponding binary output image;
   an error diffusion circuit for diffusing said calculated error to pixels peripheral to said pixel of said input image; and
   a variation circuit for periodically varying said threshold by a dither matrix, said dither matrix having its periodic component vertical to a main scanning direction stronger than its periodic component vertical to a sub scanning direction.

2. The image processing apparatus according to claim 1, wherein
   said dither matrix includes a plurality of sub matrices of the same size arranged in the main scanning direction.

3. The image processing apparatus according to claim 2, wherein
   an average value of thresholds included in one sub matrix of said plurality of sub matrices is larger than an average value of thresholds included in another sub matrix.

4. The image processing apparatus according to claim 1, wherein
   said dither matrix is formed of two adjacent sub matrices, and the sub matrices each include a threshold arrangement arranged in a dot concentration manner.

5. The image processing apparatus according to claim 4, wherein
   an average value of thresholds included in said threshold arrangement is set so that the average value is larger in one of said two sub matrices than another.

6. The image processing apparatus according to claim 4, wherein
   the threshold arrangements in said two sub matrices are set so as to increase and decrease from a prescribed value.

7. The image processing apparatus according to claim 6, wherein
 a total average value of thresholds in said threshold arrangements is set to be said prescribed value.

8. An image processing apparatus, comprising:
 a binarization circuit for comparing a prescribed threshold and a density value of one pixel of an input image to obtain a density value of a pixel of a corresponding binary output image;
 an error calculation circuit for calculating as an error a difference between the density value of the one pixel of said input image and the density value of the pixel of said corresponding binary output image;
 an error diffusion circuit for diffusing said calculated error to pixels peripheral to said pixel of said input image; and
 an adding circuit for generating a bias value periodically varied by a dither matrix and adding the bias value to the density value of the pixel of said input image, said dither matrix having its periodic component vertical to a main scanning direction stronger than its periodic component vertical to a sub scanning direction.

9. The image processing apparatus according to claim 8, wherein
 said dither matrix includes a plurality of sub matrices of the same size arranged in the main scanning direction.

10. The image processing apparatus according to claim 9, wherein
 an average value of thresholds included in one sub matrix of said plurality of sub matrices is larger than an average value of thresholds included in another sub matrix.

11. The image processing apparatus according to claim 8, wherein
 said dither matrix is formed of two adjacent sub matrices, and the sub matrices each include a threshold arrangement arranged in a dot concentration manner.

12. The image processing apparatus according to claim 11, wherein
 an average value of thresholds included in said threshold arrangement is set so that the average value is larger in one of said two sub matrices than another.

13. The image processing apparatus according to claim 11, wherein
 threshold arrangements in said two sub matrices are set to increase and decrease from a prescribed value.

14. The image processing apparatus according to claim 13, wherein
 a total average value of thresholds in said threshold arrangements is set to be said prescribed value.

15. An image processing apparatus, comprising:
 a gradation conversion circuit for converting an input image having an N-bit gradation into an image having an M-bit gradation using a first threshold, the M bits being smaller than the N bits;
 a variation circuit for periodically varying said first threshold by a dither matrix, said dither matrix having its periodic component vertical to a main scanning direction stronger than its periodic component vertical to a sub scanning direction;
 a binarization circuit for comparing a density value of one pixel of the image having said M-bit gradation and a second threshold to obtain a density value of a pixel of a corresponding binary output image;
 an error calculation circuit for calculating as an error a difference between the density value of the one pixel of the image having said M-bit gradation and the density value of the pixel of said corresponding binary output image; and
 an error diffusion circuit for diffusing said calculated error to pixels peripheral to said pixel of the image having said M-bit gradation.

16. The image processing apparatus according to claim 15, wherein
 said dither matrix includes a plurality of sub matrices of the same size arranged in the main scanning direction.

17. The image processing apparatus according to claim 16, wherein
 an average value of thresholds included in one sub matrix of said plurality of sub matrices is larger than an average value of thresholds included in another sub matrix.

18. The image processing apparatus according to claim 15, wherein
 said dither matrix is formed of two adjacent sub matrices, and the sub matrices each include a threshold arrangement arranged in a dot concentration manner.

19. The image processing apparatus according to claim 18, wherein
 an average value of thresholds included in said threshold arrangement is set so that the average value is larger in one of said two sub matrices than another.

20. The image processing apparatus according to claim 18, wherein
 the threshold arrangements in said two sub matrices are set to increase and decrease from a prescribed value.

21. The image processing apparatus according to claim 20, wherein
 a total average value of thresholds in said threshold arrangements is set to be said prescribed value.

22. A method of outputting a binary image by processing an input image, comprising the steps of:
 comparing a prescribed threshold and a density value of one pixel of an input image to obtain a density value of a pixel of a corresponding binary output image;
 calculating as an error a difference between the density value of the one pixel of said input image and the density value of the pixel of said corresponding binary output image;
 diffusing said calculated error to pixels peripheral to said pixel of said input image; and
 periodically varying said threshold by a dither matrix having its periodic component vertical to a main scanning direction stronger than its periodic component vertical to a sub scanning direction.

23. A method of outputting a binary image by processing an input image, comprising the steps of:
 comparing a prescribed threshold and a density value of one pixel of an input image to obtain a density value of a pixel of a corresponding binary output image;
 calculating as an error a difference between the density value of the one pixel of said input image and the density value of the pixel of said corresponding binary output image;
 diffusing said calculated error to pixels peripheral to said pixel of said input image; and
 generating a bias value periodically varied by a dither matrix having its periodic component vertical to a main scanning direction stronger than its periodic component vertical to a sub scanning direction and adding the bias value to the density value of the pixel of said input image.

24. A method of outputting a binary image by producing an input image, comprising the steps:

converting an input image having an N-bit gradation into an image having an M-bit gradation using a first threshold, the M bits being smaller than the N bits;

periodically varying said first threshold by a dither matrix having its periodic component vertical to a main scanning direction stronger than its periodic component vertical to a sub scanning direction;

comparing a density value of one pixel of the image having said M-bit gradation and a second threshold to obtain a density value of a pixel of a corresponding binary output image;

calculating as an error a difference between the density value of the one pixel of the image having said M-bit gradation and the density value of the pixel of said corresponding binary output image; and diffusing said calculated error to pixels peripheral to said pixel of the image having said M-bit gradation.

* * * * *